UNITED STATES PATENT OFFICE.

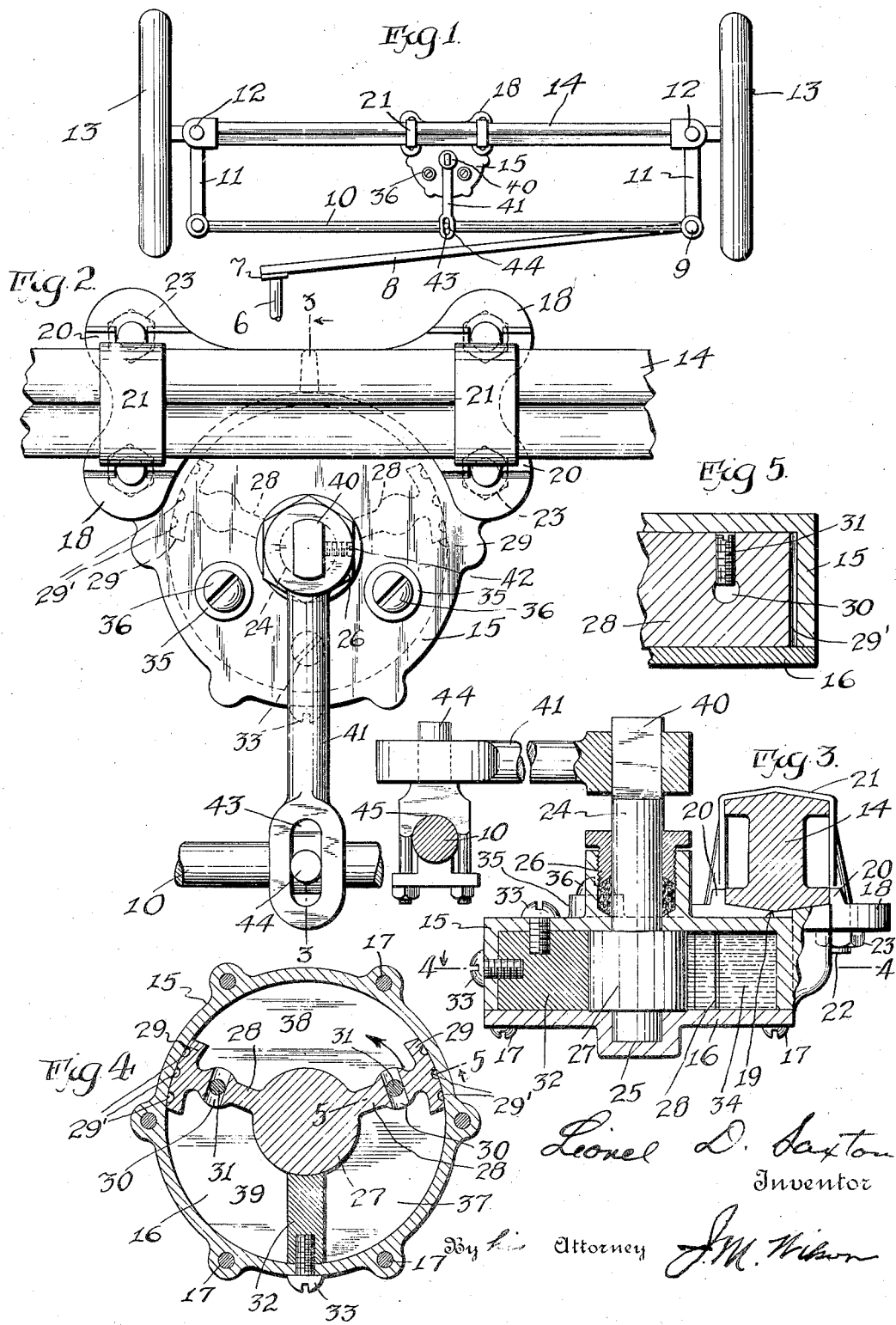

LIONEL D. SAXTON, OF NEW YORK, N. Y.

ATTACHMENT FOR STEERING MECHANISMS.

1,276,121.  Specification of Letters Patent.  Patented Aug. 20, 1918.

Application filed April 27, 1917. Serial No. 164,841.

*To all whom it may concern:*

Be it known that I, LIONEL D. SAXTON, a citizen of the United States, residing in the city, county, and State of New York, have invented a new and useful Attachment for Steering Mechanisms, of which the following is a specification.

This invention relates to a check or shock absorber for steering mechanisms such as are used on motor vehicles, and has for its object the providing of a device of simple nature which can be manufactured economically, positioned on a vehicle with ease, and which can be relied upon when in use to operate against the deflection of the wheels of the vehicle when they come in contact with any obstructions in the road.

Vibration of the steering wheel is also minimized by my invention, loose parts in the steering gear are compensated for, and tight gripping of the steering wheel at all times is made unnecessary, thereby relieving the inevitable strain upon the driver on rough or narrow roads.

While the construction is different, this invention is similar in its objects to that disclosed in my copending application, Serial Number 122,349, filed September 27th, 1916.

Other advantages and objects are set forth in the following specification and shown in the drawings herewith in which:—

Figure 1 is a diagrammatic plan view showing my device attached to the steering mechanism of a vehicle.

Fig. 2 is a plan view of the device.

Fig. 3 is a cross sectional view taken on the line 3—3 of Fig. 2.

Fig. 4 is a sectional plan view taken on the line 4—4 of Fig. 2.

Fig. 5 is a fragmentary sectional view taken on the line 5—5 of Fig. 4.

As shown in Fig. 1, the steering column 6 is secured at 7 to the rod 8 which is pivoted at 9 to the tie rod 10, which extends across the front of the vehicle and has pivoted to it at either end the links 11—11, which are secured at 12—12 to the steering knuckles which carry the wheels 13—13 and are mounted on the main front shaft 14, my device being secured to the said shaft 14 and pivotally connected to the tie rod 10.

It consists of a chamber 15, with a cover plate 16 secured by the screws or bolts 17, as shown in Fig. 3. Lateral extensions 18—18 are provided, with depressed seats 19—19 to receive the shaft 14, and guides 20—20, alongside the seats 19—19. The device is firmly secured to the shaft 14 by the yokes 21—21, which have threaded ends 22—22, the yokes 21—21 passing over the shaft and the threaded ends passing through openings in the lateral extensions 18—18 where they are held by the nuts 23—23.

Through the center of the device passes the stud or shaft 24, the lower end of which bears in the seat 25 formed in the cover 16, and the upper end of which passes out through the stuffing box 26, which is of the conventional form and provided to prevent any leakage of the contents of the chamber. Near its lower end the shaft 24 has an enlarged portion 27 provided with a double winged piston with arms 28—28 the outer ends of which are of extended area 29—29 which bear against the inner surface of the wall of the chamber. In the outer surface of the said extended ends, are the transverse grooves 29', into which any fluid which may pass between the said ends and the wall of the chamber, is diverted and serves to increase the resistance to the movement of the piston. Each of the arms 28—28 has an opening 30—30 and the size of this opening is controlled by the screw-threaded plugs 31—31 running across and at right angles to the said openings.

A stop member 32, which acts as a dam, is held in place by the screws 33—33 and entirely closes the opening between the top wall of the chamber and the cover thereof and between the outer wall to which the said stop member is secured and the enlarged part 27 of the shaft 24 as shown in Fig. 3.

A suitable fluid 34 is provided in the chamber and this fluid may be supplied thereto through the bosses 35 in which are the screw plugs 36. It is obvious that in filling, by moving the winged piston into different positions, the entire chamber may easily be filled. The threaded plugs 31—31 which control the size of the openings 30—30 may be adjusted also by removing the plugs 36—36 and moving the piston so that the plugs 31—31 are under the openings thus exposed.

Herein, but two of these openings are shown but any number might be used by positioning them differently.

As will be apparent, it is most advantageous to use in a device of this nature, a double winged piston, for the reason that the increased area against which the fluid pressure works greatly increases the efficiency of the invention. As shown in Fig. 4, the chamber is divided into three compartments 37, 38 and 39 by the stop 32 and the two arms of the winged piston. For example if the piston moves in the direction of the arrow, the fluid in compartment 38 moves slowly through the opening 30 into compartment 37 and the fluid in compartment 39 also moves slowly into compartment 38 thereby forming a double check.

The shaft 24 is flattened at its upper end 40, and the lever 41 is attached thereto and held in place by the set screws 42 or other suitable means. The opposite end of this lever is slotted at 43 and engages thereby with the pin 44 on the yoke 45 which is rigidly secured to the tie rod 10. This method of engagement is employed to allow for the change of radius when swung in either direction.

For example if the wheels 13—13 are deflected to the left, the shaft 10 is moved toward the right, carrying with it the lower end of the lever 41 thereby causing the winged piston to rotate in the chamber.

I claim:—

1. In a device of the character described, a chamber adapted to be attached to a steering mechanism; means for attaching the said chamber to a steering mechanism; a wing piston having a plurality of arms mounted within the said chamber and adapted to oscillate therein; transverse apertures in the arms of the said wing piston; secondary apertures in the arms of the wing piston at right angles to the said transverse apertures; means within the said second apertures for regulating the area thereof; a plurality of openings in the top wall of the said chamber adapted to provide access to the said regulating means in the said secondary apertures; and fluid means adapted during the oscillating movement of the said wing piston to move through the said transverse apertures in the arms of the wing piston.

2. In a device of the character described, a chamber adapted to be attached to a steering mechanism; means for attaching the said chamber to a steering mechanism; a wing piston mounted within said chamber and adapted to oscillate therein and having a plurality of arms with extended ends provided with transverse grooves; transverse apertures in the arms of the wing piston; secondary apertures in the arms of the wing piston at right angles to the said transverse apertures; means within the said second apertures for regulating the area thereof; and fluid means adapted during the oscillating movement of the said wing piston to move through the said transverse apertures in the arms of the wing piston.

LIONEL D. SAXTON.

Witnesses:
WALTER M. JACKSON,
M. R. WHYTE.